United States Patent

Miharu et al.

[11] Patent Number: 5,912,070
[45] Date of Patent: Jun. 15, 1999

[54] LAMINATED FILM AND PACKAGING MATERIAL

[75] Inventors: Kenji Miharu; Masaru Kokuryou, both of Sowa-Machi; Yohzoh Yamamoto, Yamaguchi; Yasushi Amada, Tokorozawa, all of Japan

[73] Assignee: Mitsui Chemicals, Inc., Tokyo, Japan

[21] Appl. No.: 08/835,424

[22] Filed: Apr. 9, 1997

[30] Foreign Application Priority Data

Apr. 11, 1996 [JP] Japan .................................. 8-089809

[51] Int. Cl.$^6$ .......................... B32B 27/08; B32B 27/30; B32B 27/32; B32B 27/36

[52] U.S. Cl. ...................... 428/214; 428/35.7; 428/213; 428/215; 428/480; 428/483; 428/515; 428/516; 428/520; 428/522; 428/523; 428/910

[58] Field of Search .................... 428/35.7, 36.8, 428/480, 483, 910, 500, 515, 516, 520, 522, 523, 214, 213, 215

[56] References Cited

U.S. PATENT DOCUMENTS

| | | | |
|---|---|---|---|
| 5,059,487 | 10/1991 | Muro et al. | 428/500 |
| 5,187,012 | 2/1993 | Takahashi et al. | 428/402 |
| 5,218,049 | 6/1993 | Yamamoto et al. | 525/97 |
| 5,300,352 | 4/1994 | Honma | 539/212 |
| 5,366,812 | 11/1994 | Takahashi et al. | 428/523 |
| 5,532,030 | 7/1996 | Hirose et al. | 428/35.7 |

FOREIGN PATENT DOCUMENTS

| | | |
|---|---|---|
| 0 203 799 A1 | 12/1986 | European Pat. Off. . |
| 0230344 | 7/1987 | European Pat. Off. . |
| 0518542 | 12/1992 | European Pat. Off. . |
| 0570188 | 11/1993 | European Pat. Off. . |
| 0631864 | 1/1995 | European Pat. Off. . |
| 2-196832 | 3/1990 | Japan . |
| 2113696 | 8/1983 | United Kingdom . |

OTHER PUBLICATIONS

Database WPI, Section Ch, Week 8137, Derwent Publications, Ltd., London, GB; Class A17, AN 81–66691D & JP 56 092 058 A (Mitsubishi Petrochemical Co).

Schmitz, Peter et al., "Films." Ullmann's Encyclopedia of Industrial Chemistry, 5th Ed., vol. A11, pp. 85–86, 91–93, 105–106, 108–110, Jan. 1988.

*Primary Examiner*—Vivian Chen
*Attorney, Agent, or Firm*—Sherman and Shalloway

[57] ABSTRACT

A laminated film superior in the heat resistance, shock resistance, moisture-barriering property and easy hand-tearability, which comprises one or more layers of a thermoplastic polyester resin (A), one or more layers of a resin based on cycloolefin (C) and one or more interposed layers of an adhesive (B) between layer (A) and layer (C), wherein the layer(s) of the thermoplastic polyester resin (A) and optionally the layer(s) of the resin based on cycloolefin (C) have been biaxially stretched and wherein the total thickness of the layer(s) of the thermoplastic polyester resin (A), the total thickness of the layer(s) of the adhesive (B) and the total thickness of the layer(s) based on cycloolefin (C) are 0.5–50 μm, 0.5–20 μm and 5–150 μm, respectively.

24 Claims, No Drawings

LAMINATED FILM AND PACKAGING MATERIAL

FIELD OF THE INVENTION

The present invention relates to a laminated film, in particular, one which can be torn easily by hand and which is superior in the moistureproof property and, thus, is adapted to apply advantageously for packaging foods, drugs and others, as well as to a packaging material comprising a layer composed of this laminated film, especially easily hand-tearable one.

BACKGROUND OF THE INVENTION

Usually, packaging film for use in sealed packages of food products, drugs and so on are composed of double- or more multilayers including at least a heat-sealable layer and an outer coverage layer. The heat-sealable layer has a role for providing a tight sealing of the package and is made of, for example, polyethylene (PE) or polypropylene (PP). The outer coverage layer should have a heat resistance for standing against the heat upon the heat sealing and a shock resistance required for protecting the packaging (film) and the contents of the package against physical attack from outside and is in general made of, for example, polyester, polyamide (Ny), polypropylene (PP) or cellophane, solely or in combination (composite) of two or more of them.

For the outer layer of the packaging film, a film of polyester, polyamide or polypropylene is employed, which is usually biaxially stretched for further increasing the heat resistance and shock resistance.

In using a cellophane film, so-called "moisture-proof cellophane" in which one or both surfaces are treated by a moistening-protective coating by, for example, vinylidene chloride thin film, is often chosen, since ordinary cellophane has an excessive hygroscopic nature and its material properties will considerably change when moistened.

It is required for a material for the outer layer of a packaging sheet to have, in addition to the superior heat resistance and shock resistance mentioned above, a moisture-barrier property on storage and transport thereof so as to block up intrusion of external moisture into the package to prevent any moistening of the article to be packaged. An "easy hand-tearability", namely, a property for opening the package by tearing the packaging sheet easily by hand for taking out the packaged article is also an important feature required for a packaging film.

In conventional multilayer packaging films, however, none has been found to have better resistances to heat and shock together with a moisture-barriering property and an easy hand-tearability.

Thus, for the laminated films of the stand of technique in which the outer layer is constituted of cellophane, there may be enumerated combinations of, for example, cellophane/PE, moistureproof cellophane/PE, moistureproof cellophane/paper/PE and moistureproof cellophane/paper/aluminum foil/PE. Such a conventional cellophane-base laminated film has, in general, an easy hand-tearability due to the intrinsic nature of cellphane itself.

However, the above-mentioned conventional cellophane/PE laminated film is quite inferior in the moisture-barrier property. A laminated film with a moistureproof cellophane exhibits a comparatively better moisture-barrier property. However, use of the laminated film with such moistureproof cellophane has a disadvantage that considerable labourious and costly expenses have to be paid for the moistureproof coating treatment of cellophane with vinylidene chloride, since many complicated process steps are required. In addition, due to the content of chlorine in the vinylidene chloride, use of the moistureproof cellophane is problematic in view of environmental protection.

As laminated films with outer layer made of other materials, such as polyester, polyamide (Ny) and polypropylene (PP), there may be enumerated those of the combinations of biaxially stretched polyester/PP, biaxially stretched Ny/PE and biaxially stretched PP/PP.

While these laminated films with resin outer layer exhibit better moisture-barriering property, as compared with those cellophane-base laminated films mentioned above, they are as yet unsatisfactory in the moisture-barrier property and, in addition, reveal a high tearing strength of the outer layer and are thus considerably inferior in the easy hand-tearability as compared with that of cellophane-based ones.

Namely, the moisture-barrier property is insufficient for, for example, a laminated film based on polyester in which the outer layer is constituted of a polyester resin and, moreover, the easy hand-tearability of such a laminated film is quite inferior due to the excessively high tearing strength of polyester resin.

Thus, it has conventionally been practised for increasing the easy tearability of packages of laminated film based on polyester to employ a technique, in which a hand tearing easiness is given by providing the package rim with a cut-in notch or in which the tearing strength of the packaging film is lowered by providing the outer layer of the film with many microperforations. However, such a technique complicates the production of the laminated film together with additional works.

Therefore, in order to increase the moisture-barrier property, it has been practiced to employ a technical measure of surface coating with vinylidene chloride, as in the moistureproof cellophane, or a vacuum deposition treatment with, for example, aluminum or silica to form a thin coating layer. For laminated films for packaging articles to be kept from moisture, there have been practiced to use those of combinations of, for example, vinylidene chloride-coated biaxially stretched polyester/PP, vinylidene chloride-coated biaxially stretched PP/PP, biaxially stretched PP/aluminum foil/PE, biaxially stretched PP/aluminum vacuum deposited-polyester/PE and biaxially stretched polyester/aluminum foil/PE.

However, employment of these technical measures of the vinylidene chloride treatment, vacuum deposition of aluminum and interposition of aluminum foil is bound inevitably with a complexity of production of the laminated film and an increase in the production cost.

As described above, no satisfactory laminated film has been proposed in the prior art, in which better resistances to heat and shock are realized together with attainment of superior moisture-barriering property and easy hand-tearability and, in addition, a simple and economical production is permitted.

In Japanese Patent Kokai Hei 4-276253 A, packaging vessels for pharmaceutical or food products having at least one layer of a thermoplastic polymer based on saturated norbornene, in particular, those of multilayer structure with laminated layer of other thermoplastic resin and having a layer of a polymer or its hydrogenation product of ring-opening polymerization of a monomer based on norbornene is disclosed. Here, however, the packaging vessels are assigned for medical uses, such as test tubes for fluid therapy, medical cells, blood bags, medical bottles and testing cells, or for general package of food products and there is no suggestion as to the packaging material composed of a hand-tearable thin film nor any mention as to the easy hand-tearability.

SUMMARY OF THE INVENTION

An object of the present invention is to solve the problems of the prior art and to provide a laminated film superior in the resistances to heat and to shock, in the moisture-barrier property (moistureproof property) and in the easy hand-tearability, which can be produced by simple procedure economically.

Another object of the present invention is to provide a packaging material constituted of such a laminated film which is superior in the resistances to heat and to shock, in the moisture-barrier property and in the easy hand-tearability and applicable for packagings, especially for easy hand-tearable ones.

The laminated film according to the present invention comprises one or more layers of a thermoplastic polyester resin (A), one or more layers of a resin based on cycloolefin (C) and one or more interposed layers of an adhesive (B) between layer (A) and layer (C), wherein the layer(s) of the thermoplastic polyester resin (A) and/or the layer(s) of the resin based on cycloolefin (C) have been biaxially stretched and wherein the total thickness of the layer(s) of the thermoplastic polyester resin (A), the total thickness of the layer(s) of the adhesive (B) and the total thickness of the layer(s) based on cycloolefin (C) are 0.5–50 µm, 0.5–20 µm and 5–150 µm, respectively.

A preferred laminated film according to the present invention comprises a three-layered laminated film, wherein a layer of a thermoplastic polyester resin (A), a layer of an adhesive (B) and a layer of a resin based on cycloolefin (C) are laminated together in this order and the layer of the thermoplastic polyester resin (A) and/or the layer of the resin based on cycloolefin (C) consists of a biaxially stretched film and wherein the thicknesses of the layers (A) to (C) are each within the range defined above.

Another preferred laminated film of the present invention comprises a five-layered laminated film, in which a layer of a thermoplastic polyester resin (A), a layer of an adhesive (B), a layer of a resin based on cycloolefin (C), a layer of an adhesive (B) and a layer of a thermoplastic polyester resin (A) are laminated together in this order and the layers of the thermoplastic polyester resin (A) and/or the layer of the resin based on cycloolefin (C) has been biaxially stretched and wherein the thicknesses of the layers (A), (B) and (C) are each within the range defined above.

The packaging material according to the present invention comprises a layer constituted of the laminated film given above.

<<The Thermoplastic Polyester Resin (A) >>

The thermoplastic polyester resin (A) according to the present invention has ester-bonds in the polymer main chain. These ester-bonds are formed from the dicarboxylic acid component derived from dicarboxylic acid(s) and the dihydroxy compound component derived from dihydroxy compound(s). Such a thermoplastic polyester resin (A) has substantially a chained structure. This is confirmed by the fact that the thermoplastic polyester resin (A) dissolves completely in o-chlorophenol.

For the dicarboxylic acid, there may be enumerated, for example, aromatic dicarboxylic acids, such as terephthalic acid, phthalic acid (o-phthalic acid), isophthalic acid (m-phthalic acid), 2-methyl-terephthalic acid, diphenyl ether-4,4'-dicarboxylic acid and naphthalin-1,4- and -2,6-dicarboxylic acids; and aliphatic dicarboxylic acids, such as oxalic acid, succinic acid, adipic acid, azelaic acid, sebacic acid, decanedicarboxylic acid and undecanedicarboxylic acid. Among them, preference is given to terephthalic acid.

For the dihydroxy compound, there may be enumerated, for example, aliphatic glycols, such as ethylene glycol, trimethylene glycol, propylene glycol, 1,4-butanediol, neopentyl glycol, hexamethylene glycol and dodecamethylene glycol; cycloaliphatic glycols, such as cyclohexanediol and cyclohexanedimethanol; and aromatic dihydroxy compounds, such as bisphenols (such as bisphenol AF, bisphenol F, bisphenol S), hydro-quinone, 1,3-bis(2-hydroxyethoxy)benzene, 1,4-bis(2-hydroxyethoxy)benzene, 2,2-bis(4-β-hydroxyethoxy-phenyl)propane, bis(4-β-hydroxyethoxyphenyl)sulfone. Among them, preference is given to ethylene glycol.

The thermoplastic polyester resin according to the present invention may further contain structural unit(s) derived from monofunctional compound(s), such as benzoylbenzoic acid, diphenyl sulfone monocarboxylic acid, stearic acid, methoxypolyethylene glycol and phenoxypolyethylene glycol, and structural unit(s) derived from polyfunctional compound(s), such as trimethylolmethane, trimethylolethane and trimethylolpropane, in a small proportion, for example, at most 2 mole %.

For the thermoplastic polyester resin (A) to be employed according to the present invention, those which exhibit intrinsic viscosities [η] determined in o-chlorophenol at 25° C. in the range of 0.5–1.4 dl/g, preferably in the range of 0.6–1.1 dl/g are preferred. If the intrinsic viscosity [η] is less than 0.5 dl/g, any marked increase in the shock resistance and in the heat resistance after the biaxial stretching will never be attainable and, if this value exceeds 1.4 dl/g, the biaxial stretching of the resulting film tends to become difficult.

The intrinsic viscosity [η] of the thermoplastic polyester resin (A) is determined by the following procedures. Thus, a sample of the thermoplastic polyester resin is dissolved in o-chlorophenol in a concentration of 1 g/100 ml and the viscosity of the resulting solution is determined on an Ubbelohde's viscosimeter at 25° C., whereupon the solution is diluted by adding o-chlorophenol thereto to form solutions of a series of dilution ratios, the viscosities of which are then determined and the so-obtained values are extrapolated on a graph to zero concentration to determine the intrinsic viscosity [η].

For the thermoplastic polyester resin (A) which is most preferable for the present invention, those of polyethylene terephthalate are enumerated, in which the intrinsic viscosities [η] fall under the above-defined range and in which at least 80 mole %, preferably at least 90 mole % of the structural units of dicarboxylic acid compoment are occupied by the structural unit of terephthalic acid component and at least 80 mole %, preferably at least 90 mole % of the structural unit of dihydroxy compound component are occupied by the structural unit of ethylene glycol component.

These polyethylene terephthalates may be composed of only the structural unit of terephthalic acid component and the structural unit of ethylene glycol component. It is also permissible that the thermoplastic polyester resin (A) according to the present invention is present as a co-polyester (co-polymerized polyester), in which one or two or more other structural units of dicarboxylic acid components other than that of terephthalic acid component as mentioned above and one or two or more other structural units of dihydroxy compound components other than that of ethylene glycol component as mentioned above are contained or in which structural unit(s) of other component(s) derived from mono- and/or polyfunctional compounds other than those of dicarboxylic acid component and of dihydroxy compound are contained.

It is permissible to use as the thermoplastic polyester resin (A) a polyethylene terephthalate alone or a mixture (mixed polyesters) of two or more of polyethylene terephthalates or, further, a mixture of polyesters (mixed polyester) composed of polyethylene terephthalate and other thermoplastic polyesters. For such other thermoplastic polyester resins, there may be enumerated those composed of other dicarboxylic acid components than that of terephthalic acid and other dihydroxy compound components than that of ethylene glycol.

The thermoplastic polyester resin (A) can be produced by a method known per se.

It is permissible that various additives used conventionally, such as cross linking agent, heat stabilizing agent, climate stabilizing agent, antistatic agent, lubricant, mold releasing agent, inorganic fillers, pigments and dyestuffs are incorporated in the thermoplastic polyester resin (A).

<<The Resin Based on Cycloolefin (C)>>

For the resin based on cycloolefin (C), either one of the following (C-1) to (C-4) may be used alone or in combination of them. Among them, the ethylene/cycloolefin random copolymer (C-1) is favorably employed in view of the easy hand-tearability, processibility and so on.

(C-1): an ethylene/cycloolefin random copolymer obtained from copolymerization of a cycloolefin represeted by the following general formula (1) or (2) with ethylene:

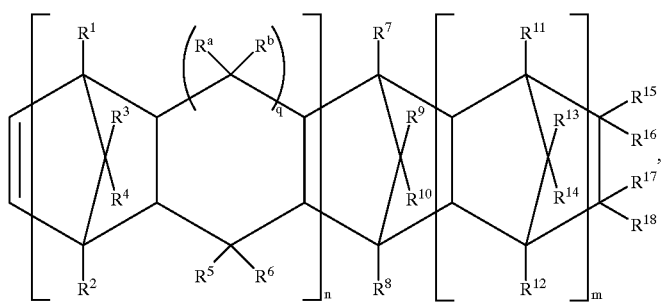

in which n is 0 or 1, m is 0 or a positive integer, q is 0 or 1, $R^1$ to $R^{18}$ and $R^a$ and $R^b$ denote each, independently of each other, hydrogen atom, a halogen atom or a hydrocarbon group which may be substituted by halogen, wherein $R^{15}$ to $R^{18}$ may combine together to form a mono- or polycyclic ring which may have double bond(s) and wherein the pair of $R^{15}$ and $R^{16}$ or of $R^{17}$ and $R^{18}$ may form an alkylidene group,

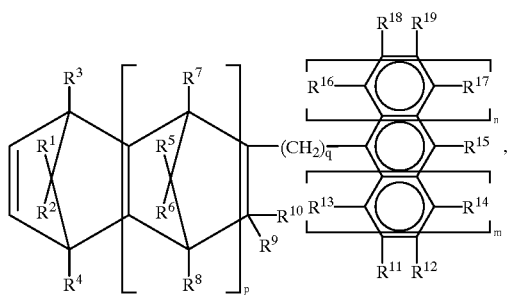

in which p and q denote each 0 or a positive integer, m and n represent each 0, 1 or 2, $R^1$ to $R^{19}$ denote each, independently of each other, hydrogen atom, a halogen atom or a hydrocarbon or alkoxy group which may be substituted by halogen, wherein the carbon atom bound to $R^9$ and $R^{10}$ and the carbon atom bound to $R^{13}$ or the carbon atom bound to $R^{11}$ may be coupled with each other either directly or through an alkylene group of 1–3 carbon atoms and, in the case of n=m=0, the pair of $R^{15}$ and $R^{12}$ or of $R^{15}$ and $R^{19}$ may combine together to form a mono- or polycyclic aromatic ring.

(C-2): a product of ring opening-polymerization or copolymerization of the cycloolefin(s) represented by the formula (1) and/or (2).

(C-3): a hydrogenated product of said polymerization or copolymerization product of (C-2).

(C-4): a graft-modified product of the above product (C-1), (C-2) or (C-3).

The glass transition temperature (Tg) of the resin based on cycloolefin to be used according to the present invention lies desirably in the range of 60–120° C., preferably 65–110 C. and more preferably 70–90° C. If the glass transition temperature is in the above range, processing of the resin is easy, so that a co-stretching with the thermoplastic polyester resin (A) is possible, and the extension magnification in the stretching can be increased, together with superior values of modulus of elasticity and strength.

The melt flow rate (MFR; at 260° C., 2.16 kg load) of the resin based on cycloolefin (C) determined at 260° C. is desirably in the range of 1–100 g/10 min., preferably 3–50 g/10 min. The softening temperature (TMA) of the resin based on cycloolefin (C) determined using a thermal mechanical analyzer may desirably be at least 60° C., preferably at least 70° C.

The degree of crystallization of the resin based on cycloolefin (C) determined by X-ray diffraction analysis may desirably be in the range of 0–20%, preferably in the range of 0–2%. Further, the intrinsic viscosity [η] of the resin based on cycloolefin (C) determined in decalin at 135° C. may desirably be in the range of 0.05–10 dl/g, preferably in the range of 0.3–2.0 dl/g and more preferably in the range of 0.4–1.2 dl/g.

The iodine value of the resin based on cycloolefin (C) may usually be at highest 5 and in most cases at highest 1.

Now, the description will be directed to the cycloolefin represented by the general formula (1) or (2) given above which builds up the resin based on cycloolefin (C).

<<The Cycloolefin>>

In the cycloolefin represented by the formula (1), n is 0 or 1, m is 0 or a positive integer and q is 0 or 1. In case q is 1, $R^a$ and $R^b$ may, independently of each other, stand for an atom as given below or a hydrocarbon group and, in case q equals 0, they form a 5-membered ring by binding the chemical bonds with each other.

$R^1$–$R^{18}$ and $R^a$ and $R^b$ stand each, independently of each other, for hydrogen atom, a halogen atom or a hydrocarbon group permissible of being substituted by halogen.

Here, the halogen atom is fluorine atom, chlorine atom, bromine atom or iodine atom.

As the hydrocarbon group, there may usually be enumerated, independently of each other, an alkyl group having 1–20 carbon atoms, a cycloalkyl group having 3–15 carbon atoms or an aromatic hydrocarbon group.

More concretely, there may be enumerated, as the alkyl group, methyl, ethyl, propyl, isopropyl, amyl, hexyl, octyl, decyl, dodecyl and octadecyl.

As the cycloalkyl group, cyclohexyl may be enumerated and, as the aromatic hydrocarbon group, for example, phenyl, naphtyl and the like may be enumerated.

These hydrocarbon groups may be substituted by halogen atom(s).

In the general formula (1) for the cycloolefin, $R^{15}$–$R^{18}$ may combine together (collaborate together) to form a mono- or polycyclic ring, wherein the ring may have double bond(s). Concrete examples of such mono- or polycyclic ring will be recited afterwards.

In the formula (2) for the cycloolefin, p and q represent both 0 or a positive integer and m and n represent both 0, 1 or 2. $R^1$–$R^{19}$ denote each, independently of each other, hydrogen atom, a halogen atom, a hydrocarbon group or an alkoxy group. The hydrocarbon group and the alkoxy group may be substituted by halogen atom(s). The halogen atom stand for fluorine, chlorine, bromine and iodine.

As the hydrocarbon group, there may be exemplified, independently of each other, alkyl groups having 1–20 carbon atoms which may be substituted by halogen and cycloalkyl and aromatic hydrocarbon groups having 3–15 carbon atoms. More concretely, there may be enumerated, for the alkyl groups, methyl, ethyl, propyl, isopropyl, amyl, hexyl, octyl, decyl, dodecyl and octadecyl; for the cycloalkyl groups, cyclohexyl; and for the aromatic hydrocarbon groups, aryl and aralkyl groups, such as phenyl, tolyl, naphthyl, benzyl and phenylethyl.

As the alkoxy group, there may be exemplified methoxy, ethoxy and propoxy.

The hydrocarbon group and the alkoxy group may be substituted by fluorine, chlorine, bromine or iodine.

In the general formula (2) for the cycloolefin, the carbon atom to which $R^9$ and $R^{10}$ are bound and the carbon atom to which $R^{13}$ is bound or the carbon atom to which $R^{11}$ is bound may be bound together either directly or through an alkylene group having 1–3 carbon atoms. Thus, in case the above-mentioned two carbon atoms are bound together through an alkylene group, the pair of $R^9$ and $R^{13}$ or of $R^{10}$ and $R^{11}$ forms the alkylene group, such as methylene (—$CH_2$—), ethylene (—$CH_2CH_2$—) or trimethylene (—$CH_2CH_2CH_2$—), by cooperation together.

It is possible, when n=m=0 in the general formula (2) for the cycloolefin, that the pair of $R^{15}$ and $R^{12}$ or of $R^{15}$ and $R^{19}$ may form a mono- or polycyclic ring by combining together. Concrete examples therefor are given below. In the formulae, p is the same as that in the general formula (2).

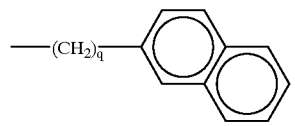

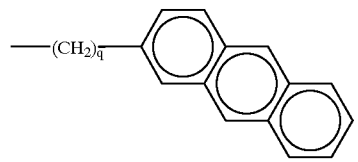

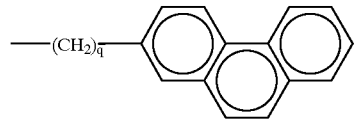

As concrete examples of the cycloolefin represented by the general formula (1) or (2), bicyclo-[2.2.1]-2-hepten (i.e. norbornene) represented by the formula (3) given below and substituted derivatives thereof substituted by one or more hydrocarbon groups:

(3)

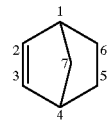

In the above formula, the numerals 1 to 7 indicate the site of each carbon atom.

Examples of the hydrocarbon group for substituting the cycloolefin exemplified by the formula (3) include 5-methyl, 5,6-dimethyl, 1-methyl, 5-ethyl, 5-n-butyl, 5-isobutyl, 7-methyl, 5-phenyl, 5-methyl-5-phenyl, 5-benzyl, 5-tolyl, 5-(ethylphenyl), 5-(iso-propylphenyl), 5-(biphenyl), 5-(β-naphthyl), 5-(a -naphthyl), 5-(anthracenyl) and 5,6-diphenyl.

As other derivatives, there may be exemplified cyclopentadien-acenaphthylene adduct, 1,4-methano-1,4,4a, 9a-tetrahydrofluorene, 1,4-methano-1,4,4a,5,10,10 a-hexahydroanthracene and the like.

Further, as concrete examples of the cycloolefin represented by the general formula (1) or (2), tricyclo[4.3.0.1$^{2,5}$]-3-decene and its derivatives, such as 2-methyltricyclo[4.3.0.1$^{2,5}$]-3- decene and 5-methyltricyclo[4.3.0.1$^{2,5}$]-3-decene; tricyclo[4.4.0.1$^{2,5}$]3-undecene and its derivatives, such as 10-methyltricyclo-[4.4.0.1$^{2,5}$]-3-undecene; and tetracyclo-[4.4.0.1$^{2,5}$.1$^{7,10}$]-3-dodecene represented by the formula (4) given below and its substitution derivatives with one or more substituent hydrocarbon groups may be enumerated:

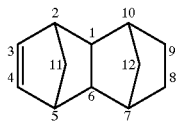

(4)

As the hydrocarbon substituent group for substituting the cycloolefin represented by the formula (4) there may be exemplified, 8-methyl, 8-ethyl, 8-propyl, 8-butyl, 8-isobutyl, 8-hexyl, 8-cyclohexyl, 8-stearyl, 5,10-dimethyl, 2,10-dimethyl, 8,9-dimethyl, 8-ethyl-9-methyl, 11,12-dimethyl, 2,7,9-trimethyl, 2,7-dimethyl-9-ethyl, 9-isobutyl-2,7-dimethyl, 9,11,12-trimethyl, 9-ethyl-11,12-dimethyl, 9-isobutyl-11,12-dimethyl, 5,8,9,10-tetramethyl, 8-ethylidene, 8-ethylidene-9-methyl, 8-ethylidene-9-ethyl, 8-ethylidene-9-isopropyl, 8-ethylidene-9-butyl, 8-n-propylidene, 8-n-propylidene-9-methyl, 8-n-propylidene-9-ethyl, 8-n-propylidene-9-isopropyl, 8-n-propylidene-9-butyl, 8-isopropylidene, 8-isopropylidene-9-methyl, 8-isopropylidene-9-ethyl, 8-isopropylidene-9-isopropyl, 8-isopropylidene-9-butyl, 8-chloro, 9-bromo, 8-fluoro, 8,9-dichloro, 8-phenyl, 8-methyl-8-phenyl, 8-benzyl, 8-tolyl, 8-(methylphenyl), 8-(isopropylphenyl), 8,9-diphenyl, 8-(biphenyl), 8-($\beta$-naphthyl), 8-($\alpha$-naphthyl), 8-(anthracenyl) and 5,6-diphenyl.

There may furthermore be enumerated, for example, derivatives of tetracyclo[4.4.0.1$^{2, 5}$.1$^{7, 10}$]-3-dodecene, such as an adduct of cyclopentadiene to a cyclopentadiene-acenaphthylene adduct; pentacyclo-[6.5.1.1$^{3, 6}$.0$^{2, 7}$.0$^{9, 13}$]-4-pentadecene and derivatives thereof; pentacyclo-[7.4.0.1$^{2, 5}$.1$^{9, 12}$.0$^{8, 13}$]-3-pentadecene and derivatives thereof; pentacyclo-[8.4.0.1$^{2, 5}$.-1$^{9, 12}$.0$^{8, 13}$]-3-hexadecene and derivatives thereof; bx;1pentacyclo-[6.6.1.1$^{3, 6}$.0$^{2, 7}$.0$^{9, 14}$]-4-hexadecene and derivatives thereof; hexacyclo-[6.6.1.1$^{3, 6}$.1$^{10, 13}$.0$^{2, 7}$.-0$^{9, 14}$]-4-heptadecene and derivatives thereof; heptacyclo-[8.7.0.1$^{2, 9}$.1$^{4, 7}$.1$^{11, 17}$.0$^{3, 8}$.0$^{12, 16}$]-5-eicosene and derivatives thereof; heptacyclo-[8.7.0.1$^{3, 6}$.1$^{10, 17}$.1$^{12, 15}$.0$^{2, 7}$.0$^{11, 16}$]-4-eicosene and derivatives thereof; heptacyclo-[8.8.0.1$^{2, 9}$.1$^{4, 7}$.1$^{11, 18}$.0$^{3, 8}$.0$^{12}$,17]-5-eicosene and derivatives thereof; octacyclo-[8.8.0.1$^{2, 9}$.1$^{4, 7}$.1$^{11, 18}$. 1$^{13, 16}$.0$^{3, 8}$.0$^{12, 17}$]-5-docosene and derivatives thereof; and nonacyclo-[10.9.1.1$^{4, 7}$.1$^{13, 20}$.1$^{15, 18}$.0$^{2, 10}$.0$^{3, 8}$.-0$^{12, 21}$.0$^{14, 19}$]-5-pentacosene and derivatives thereof.

More concrete molecular structures of the above-exemplified cycloolefins represented by the formulae (1) and (2) are given in our copending Japanese patent Kokai Hei-5-196475 A in the subsection Nos. [0032] to [0054]. Those which are exemplified therein can also be used as the cycloolefin according to the present invention.

The cycloolefins represented by the formulae (1) and (2) can be produced by subjecting cyclopentadien and an olefin having corresponding molecular structure to a Diels-Alder reaction.

These cycloolefins may be employed solely or in combination of two or more of them.

The resin based on cycloolefin (C) to be employed according to the present invention can be produced using the cycloolefin represented by the general formula (1) or (2), for example, in accordance with either of the methods proposed by the applicant in our laid open patent specifications of Japanese Patent Kokais Sho 60-168708 A (corresponding to EP 156494 A), 61-120816 A, 61-115912 A (corresponding to EP 156464 A), 61-115916 A, 61-271308 A (corresponding to EP 203799 A), 61-272216 A (corresponding to EP 203766 A), 62-252406 A (corresponding to EP 203799 A) and 62-252407 A by selecting suitable conditions.

<<The Ethylene/Cycloolefin Random Copolymer (C-1) >>

The ethylene/cycloolefin random copolymer (C-1) contains, in general, the structural unit derived from ethylene in a proportion of 20–95 mole %, preferably 30–90 mole %, and the structural unit derived from the cycloolefin in a proportion of 5–80 mole %, preferably 10–70 mole %, based on the total structural units in the coplymer. The molar proportions of ethylene and of the cycloolefin are determined by $^{13}$C-NMR.

The ethylene/cycloolefin random copolymer (C-1) has substantially a chained molecular structure in which the component structural unit derived from ethylene and the component structural unit derived from the cycloolefin are distributed radomly over the copolymer molecule. The fact that this copolymer exists in substantially a chained form and is substantially devoid of gelled cross-linked structure can be confirmed by the fact that no insoluble matter is left in the solution when dissolved in an organic solvent. For example, this is confirmed by the fact that the copolymer dissolves, upon the determination of its intrinsic viscosity, in decalin at 135° C. completely.

It is assumed that, in the ethylene/cyclooefin random copolymer (C-1), the cycloolefin represented by the formula (1) or (2) constitutes at least partly the repeating unit represented by the following general formula (1-a) or (2-a):

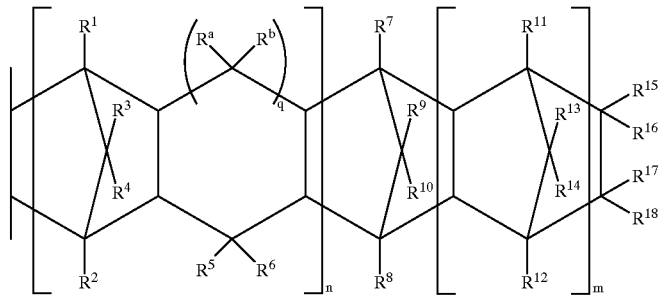

(1-a)

In the formula (1-a) the symbols n, m, q, $R^1$ to $R^{18}$ and $R^a$ and $R^b$ are the same as in the formula (1).

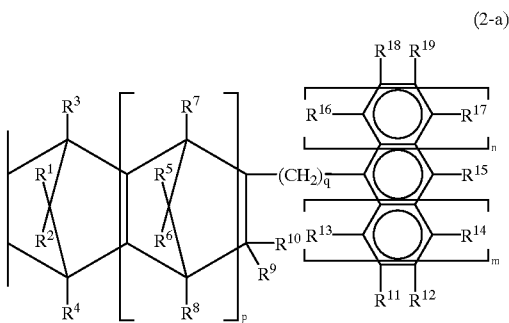

(2-a)

In the formula (2-a), the symbols n, m, p. q and $R^1$ to $R^{19}$ are the same as in the formula (2).

It is possible that the ethylene/cycloolefin random copolymer (C-1) includes, if necessary, other structural unit(s) derived from other copolymerizable comonomer(s) within the range not harmful to the purpose of the present invention.

For such other comonomers, olefins other than ethylene and the cycloolefin may be enumerated. Concretely, there may be enumerated, for example, α-olefins having 3–20 carbon atoms, such as, propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene and 1-eicosene; cycloolefins, such as, cyclobutene, cyclopentene, cyclohexene, 3,4-dimethylcyclopentene, 3-meththylcyclohexene, 2-(2-methylbutyl)-1-cyclohexene, cyclooctene and 3a,5,6,7a-tetrahydro-4,7-methano-1H-indene; and non-conjugated dienes, such as, 1,4-hexadiene, 4-methyl-1,4-hexadiene, 5-methyl-1,4-hexadiene, 1,7-octadiene, dicyclopentadiene and 5-vinyl-2-norbornene.

These other comonomers can be employed either solely or in combination. In the ethylene/cycloolefin random copolymer (C-1), the structural unit(s) derived from such other comonomer(s) as above may usually be contained in a proportion of at most 20 mole %, preferbly at most 10 mole %.

The ethylene/cycloolefin random copolymer (C-1) to be used according to the present invention can be produced by the production processes disclosed in the above-cited patent gazettes using ethylene and a cycloolefin represented by the formula (1) or (2). For example, an ethylene/cycloolefin random copolymer can be produced by carrying out the copolymerization in a hydrocarbon solvent using a catalyst which is formed from a vanadium compound and an organoaluminum compound and which is soluble in the hydrocarbon solvent.

It is also possible to use a solid catalyst based on a metallocene of IV-B group metal. Here, by "solid catalyst based on metallocene of a IV-B group metal" is meant a catalyst constituted of a transition metal compound containing a ligand having a cyclopentadienyl skeleton, an organoaluminum oxy-compound and, if necessary, an organoaluminum compound. As the transition metal of IV-B group, zirconium, titanium and hafnium are enumerated. The trasnsition metal compound contains at least one ligand having a cyclopentadienyl skeleton. As examples of the ligand having a cyclopentadienyl skeleton , a cyclopentadienyl group or an indenyl, tetrahydroindenyl and a fluorenyl group, which may each be substituted by an alkyl, may be enumerated. These groups may be bound via an other group, such as an alkylene etc. The ligand other than that containing the cyclipentadienyl group may stand for an alkyl, cycloalkyl, aryl and aralkyl.

For the organoaluminum oxy-compound and for the organoaluminum compound, those which are used usually for producing a resin based on olefin may be employed. For such catalysts based on metallocenes of IV-B group metals, disclosures may be seen in, for example, Japanese Patent Kokais Sho 61-221206 A, Sho 64-106 A and Hei 2-173112 A.

<<The Cycloolefin Ring-Openeing Homo- and Copolymer (C-2) >>

It is believed that, in the cycloolefin ring-opening homo- and copolymer, at least a part of the cycloolefin monomer represented by the general formula (1) or (2) constitutes a repeating unit expressed by the following formula (1-b) or (2-b):

(1-b)

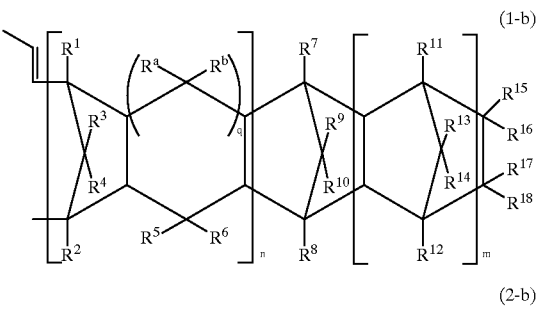

(2-b)

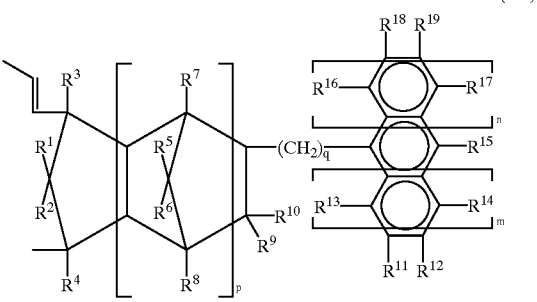

In the above formula (1-b), the symbols n, m, q, $R^1$–$R^{18}$ and $R^a$ and $R^b$ are the same as those in the formula (1) and, in the above formula (2-b), the symbols n, m, p, q and $R^1$–$R^{19}$ are the same as those in the formula (2).

The ring-opening homo- and copolymer, namely, homopolymer and copolymer (C-2) can be produced by the production processes disclosed in the above-cited patent gazzetes. For example, they can be produced by subjecting the cycloolefin represented by the general formula (1) or (2) to a homopolymerization or copolymerization in the presence of a ring-opening catalyst. For such ring- opening catalyst, it is possible to use a catalyst composed of a halide, a nitrate or an acetylacetonato complex of a metal selected from ruthenium, rhodium, palladium, osmium, iridium, platinum and so on and of a reducing agent; and a catalyst composed of a halide or an acetylacetonato complex of a metal selected from titanium, palladium, zirconium, molybdenum and so on and of an organoaluminum compound.

<<The Hydrogenation Product (C-3) of the Ring-Opening Homo- or Copolymer>>

The hydrogenation product (C-3) of the ring-opening homopolymer or copolymer is obtained by hydrogenating the ring-opening homopolymer or copolymer (C-2) in the presence of a known hydrogenation catalyst.

It is believed that at least a part of the cycloolefin monomers of the general formulae (1) and (2) will build up in the hydrogenation product (C-3) of the ring-opening homopolymer or copolymer either one of the structural units represented by the following formulae (1-c) and (2-c).

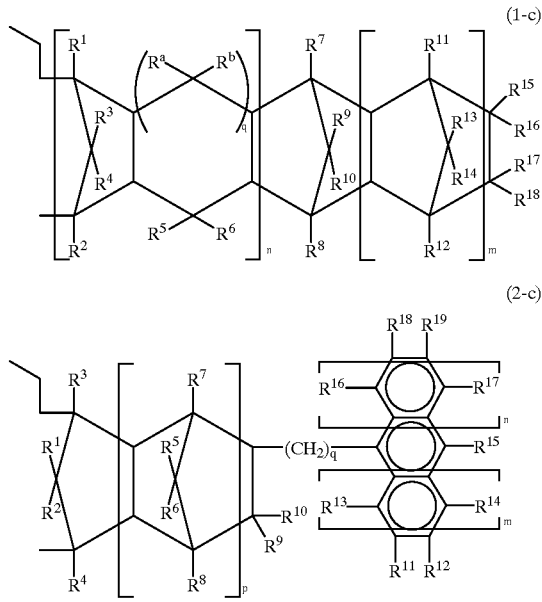

The symbols n, m, q, $R^1$–$R^{18}$ and $R^a$ and $R^b$ in the above formulae (1-c) are the same as those of the formula (1) and the symbols m, n, p, q, $R^1$–$R^{19}$ in the above formula (2-c) are the same as those of the formula (2).

<<The Graft-Modified Product (C-4)>>

The graft-modified product to be used according to the present invention is obtainable by graft-modifying the above-mentioned ethylene/cycloolefin random copolymer (C-1), the cycloolefin ring-opening homo- or copolymer (C-2) or the hydrogenation product of the cycloolefin homo- or copolymer (C-3).

As the graft-modifiying agent, unsaturated carboxylic acids are used in general. Concrete examples thereof include unsaturated carboxylic acids, such as acrylic acid, methacrylic acid, maleic acid, fumaric acid, tetrahydrophthalic acid, itaconic acid, citraconic acid, methyl tetrahydrophthalic acid, crotonic acid, isocrotonic acid and endocis-bicyclo[2.2.1] hept-5-ene-2,3-dicarboxylic acid (Nadic acid: trademark); derivatives of these unsaturated carboxylic acid, such as, unsaturated carboxylic acid anhydride, unsaturated carboxylic acid halides, unsaturated carboxylic acid amides, unsaturated acid imides and unsaturated acid esters.

More concretely, there may be enumerated as the derivatives of the unsaturated carboxylic acid maleic anhydride, citraconic anhydride, maleyl chloride, maleimide, monomethyl maleate, dimethyl maleate and glycidyl maleate.

Among these modifying agents, preference is given for α, β-unsaturated dicarboxylic acids and α, β-unsaturated dicarboxylic acid anhydrides, for example, maleic acid and Nadic acid as well as the anhydrides of these acids.

The modifying agents may be used each alone or in combination of two or more of them.

Usually, the graft modification degree in the graft modification product (C-4) of the resin based on cycloolefin may preferably be 10 mole % or less.

The graft-modified product of the resin based on cycloolefin (C-4) can either be produced by blending a graft-modifying agent to the resin based on cycloolefin (C-1), (C-2) or (C-3) in such an amount as to reach the contem- plated modification degree and effecting a graft polymerization, or by producing preliminarily a modified product of high modification degree and mixing this product with an unmodified resin based on cycloolefin.

For obtaining a graft-modified product (C-4) from a resin based on cycloolefin and a modifying agent, known methods for modifying polymer products can widely be employed. For example, a technique in which the modifying agent is admixed into a melt of the resin based on cycloolefin to effect the graft polymerization (reaction) and a technique in which the modifying agent is admixed into a solution of the resin based on cycloolefin may be employed. Such grafting reaction may be realized usually at a temperature of 60–350° C. The grafting reaction may be carried out in the co-existence of a radical initiator, such as an organic peroxy compound or an azo compound.

According to the present invention, it is permissible to use, as the resin based on cycloolefin, either one of the resins (C-1), (C-2), (C-3) and (C-4) solely or in combination with others.

For the resin based on cycloolefin (C) to be used according to the present invention, it is desirable to use an ethylene/cycloolefin random copolymer (C-1) in view of the hand-tearability and formability.

According to the present invention, it is also permissible to incorporate various polymers (resin components), such as given below, in the resin based on cycloolefin (C).

Thus, the layer of the resin based on cycloolefin (C) may contain polymers other than the resin based on cycloolefin (C) in an amount not obstructing the purpose of the invention. For such other polymers, there may be enumerated, for example, homo- and copolymers of α-olefins, such as high density polyethylene (HDPE) and linear low density polyethylene (LLDPE), polyamides, polyesters, ethylene/vinyl alcohol copolymer, polyvinyl chloride and polyvinylidene chloride.

Among the above-mentioned other polymers, homo- and copolymers of α-olefin which are superior in the transparency are preferred, wherein, concretely, high density polyethylene (HDPE) and linear low density polyethylene (LLDPE) used also for the adhesive layer (B), as explained afterwards, are especially preferable.

According to the present invention, the layer of the resin based on cycloolefin (C) may contain elastomer(s) capable of increasing the impact strength, such as ethylene/propylene/diene terpolymer (EPDM), styrene/butadiene/styrene triblock copolymer (SBS), styrene/ethylene/butene/styrene triblock copolymer (SEBS), styrene/isoprene/styrene triblock copolymer (SIS) or styrene/ethylene/propylene/styrene triblock copolymer (SEPS, i.e. hydrogenated SIS).

The layer of the resin based on cycloolefin (C) may contain those other polymers and/or the elastomers mentioned above in an amount in total of 0.5–40%, preferably 1–20% and more preferably 3–10%, based on the weight of the resin based on cycloolefin (C).

The layer of the resin based on cycloolefin (C) may contain also additives, such as, UV absorbing agent, heat stabilizing agent, climate stabilizing agent, photostabilizing agent, antistatic agent, slip agent, antiblocking agent, anti-clouding agent, nucleating agent, lubricant, dyestuff for absorbing a ray of special wave length, pigment, natural petroleum, synthetic oil, wax and light-permeable filler.

On blending the other compounding components, such as the above-mentioned other polymers, elastomers and fillers, with the resin based on cycloolefin (C), these other components may be dry-bended with the resin based on cycloolefin (C) directly before the molding or forming of the layer (C) or it is also possible to have recourse to a technique of preparing preliminarily a pelleted product of such mixture by effecting a melt kneading of the resin based on cycloolefin (C) together with the above-mentioned other components and supplying this pelleted product to the molding machine. It is also possible to dissolve the resin based on cycloolefin (C) and other components each solely or all together in an adequate solvent to mix them in a solution and, after removal of the solvent, the resulting mixture is supplied to the molding machine.

<<The Adhesive (B) >>

In this invention, the adhesive for the layer (B) may be chosen adequately among various ones in accordance with the production methods of the laminated film. In other words, various adhesives are employed in accordance with the specific lamination procedures of the thermoplastic polyester resin (A) and the resin based on cycloolefin (C).

In the case of, for example, employing a lamination technique of co-extruding T-die, co-extrusion inflation molding or co-extrusion coating for producing the laminated film according to the present inention, known resins exhibiting adhesive property served for known adhesives for thermoplastic polyester resins may widely be employed as the adhesive of the layer (B). For example, unsaturated carboxylic acid-modified polyolefin resins, low or non-crystalline soft copolymers, such as unsaturated polyolefins, an ethylene/acrylate/maleic anhydride terpolymer or resin compositions containing these polymers, may preferably be employed therefor.

Now, the unsaturated carboxylic acid-modified polyolefin reins to be employed according to the present invention are described in detail. In the following, the modification with unsaturated carboxylic acid may occasionally be expressed simply as "the modification".

The Unsaturated Carboxylic Acid-Modified Polyolefin Resin

As the unsaturated carboxylic acid-modified polyolefin resin, there may be employed, for example, a modified ethylene/α-olefin random copolymer, in which the grafted amount of the unsaturated carboxylic acid or its derivative is 0.01–10% by weight, preferably 0.1–5% by weight, the melt flow rate (MFR; according to ASTM D 1238, F) is 0.1–50 g/10 min., preferably 0.2–20 g/10 min., the density is 0.850–0.905 g/cm$^3$, preferably 0.860–0.900 g/cm$^3$ and the ethylene content amounts to 75–95 mole %, preferably 77–93 mole %, with a degree of crystallinity determined by X-ray diffraction of 30% or less, preferably 10% or less, more preferably 7% or less.

If the grafted amount of the unsaturated carboxylic acid or its derivative is less than 0.01% by weight of the polyolefin resin, the adhesion onto the thermoplastic polyester resin (A) and onto the resin based on cycloolefin (C) may eventually be insuffient. On the other hand, if the grafted amount exceeds 10% by wight of the polyolefin resin, a partial cross linking of the polyolefin resin tends to occur, resulting in a decrease in the formability and in the transparency and adhesion strength as well.

When the MFR value is in the above-mentioned range, both the formability and the adhesion remain superior, though, they tend to become inferior when exceeding the above range due to excessively high or excessively low melt viscosity of the resulting adhesive layer. So long the density and the degree of crystallinity of the modified polyester resin remain in the above-mentioned range, the adhesive layer exhibits a superior adhesion strength after the heat treatment, however, if the density exceeds 0.905 g/cm$^3$, or, if the degree of crystallinity is higher than 30%, the adhesion strength after the heat treatment may occasionally be decreased.

For the α-olefin to be used for preparing the unsaturated carboxylic acid-modified ethylene/α-olefin random copolymer, those which have about 3–20 carbon atoms are usually employed. Concretely, there are exemplified propylene, 1-butene, 1-hexene, 4-methyl-1-pentene, 1-octene, 1-decene, 1-tetradecene and 1-octadecene. According to the present invention, one or more of these α-olefins can be used each alone or in combination of two or more of them.

The basal or original ethylene/α-olefin random copolymer for the unsaturated carboxylic acid-modified polyolefin to be used according to the present invention before the modification may preferably have an MFR value of 0.1–50 g/10 min., a density of 0.850–0.905 g/cm$^3$, an ethylene content of 75–95 mole % and a degree of crystallinity determined by X-ray diffraction of 30% or less.

For the unsaturated carboxylic acid or the derivative thereof to be grafted onto the ethylene/α-olefin random copolymer, there may be employed, for example, acrylic acid, maleic acid, fumaric acid, tetrahydrophthalic acid, itaconic acid, citraconic acid, crotonic acid isocrotonic acid and Nadic acid (trademark) and the derivative of them, such as, acid halide, amide, imide, acid anhydride and ester.

Concrete examples of the unsaturated carboxylic acid derivatives include maleyl chloride, maleimide, maleic anhydride, citraconic anhydride, monomethyl maleate, dimethyl maleate and glycidyl maleate.

Among these, unsaturated dicarboxylic acids and their anhydrides are preferred and special preference is given to malic acid and Nadic acid (trademark) as well as their anhydrides.

For producing the graft-modified copolymer by grafting a graftcomonomer chosen among the above unsaturated carboxylic acids and their derivatives onto the ethylene/α-olefin random copolymer, known methods can adequately be utilized. For example, there may be employed a technique in which the ethylene/α-olefin random copolymer is melted and the graftcomonomer is added thereto to effect the graftcopolymerization or a technique in which the ethylene/α-olefin random copolymer is dissolved in a suitable solvent and the graftcomonomer is added thereto to effect the graft-copolymerization.

It is preferable in each case to effect the reaction in the presence of a radical initiator, in order to proceed the graftcopolymerization with the graftcomonomer efficiently. The graftcopolymerization is performed usually at a temperature of 60–350 ° C. The radical initiator is used usually in an amount of 0.001–1 part by weight per 100 parts by weight of the ethylene/α-olefin random copolymer.

As the radical initiator, for example, organic peroxides, organic peroxyesters and azo compounds are employed.

Among these radical initiators, preference is given to dialkylperoxides, such as dicumylperoxide, di-tert-butylperoxide, 2,5-dimethyl-2,5-di(tert-butylperoxy)-hexine-3,2,5-dimethyl-2,5-di(tert-butylperoxy)-hexane and 1,4-bis(tert-butylperoxyisopropyl)benzene.

The unsaturated carboxylic acid-modified polyolefin resin to be used as the adhesive (B) according to the present invention may be partly diluted by the unmodified polyolefin, such as ethylene/α-olefin random copolymer. In this case, the grafted amount of the modifying agent, namely the unsaturated carboxylic acid, calculated based on the mixture should be in the above defined range.

The unsaturated carboxylic acid-modified polyolefin resin to be used for the adhesive (B) may contain partly the modified or unmodified polyolefin resin having a degree of crystallinity out of the above-mentioned range. In this case, the degree of crystallinity calculated based on the mixture should be in the above defined range.

Concrete examples of the adhesive (B) according to the present invention include a maleic anhydridemodified polyolefin resin (for example, commercial products of Adomer (trademark) of Mitsui Petrochemial Ind., Ltd. and Modic (trademark) of the Mitusubishi Chemical Co., Ltd.), low or non-crystalline soft copolymers of unsaturated polyolefin etc., an ethylene/acrylate/maleicanhydride terpolymer (such as the commercial product Bondyne (trademark) of Sumika-CDF Limit. Resp. Co.) and compositions containing these adhesive polymers.

On the production of the laminated film by co-extrusion T-die, co-extrusion inflation molding or co-extrusion coating, the MFR (according to ASTM D 1238, F) may desirably be in the range of 0.01–100 g/10 min., preferbly 0.1–50 g/10 min., more preferably 1.0–20 g/10 min.

On the production of the laminated film by dry-laminating technique, commercial adhesives, such as those based on urethane, polyester, polyether, acryl and vinyl acetate, can widely be employed for the adhesive (B) according to the present invention.

Concrete examples of the adhesives based on urethane, polyester, polyeter, acryl and vinyl for the adhesive (B) include those given below, wherein solvent type binary liquid products based on aliphatic polyester are employed. For example, commercial products, such as LX-704 (trade article No.) of Dainippon Ink & Chemicals, Inc. of aliphatic polyester base and E-263 (trade article No.) of Dainichiseika Color & Chemicals Mfg. Co, Ltd. of aliphatic polyester base and AD502 (trade article No.) of Toyo Moton K.K. of aliphatic polyester base, are enumerated.

<<The Laminated Film>>

In the laminated film according to the present invention, one or more layers of a thermoplastic polyester resin (A) and one or more layers of a resin based on cycloolefin (C) are laminated with one or more layers of an adhesive (B) interposed between layer (A) and layer (C), wherein the layer(s) of the thermoplastic polyester resin (A) and/or the layer(s) of the resin based on cycloolefin (C) have been biaxially stretched. For such laminated films, there may be exemplified ① a laminate in which one layer (A) and one layer (C) are used, ② a laminate in which two layers (A) and one layer (C) are used and ③ a laminate in which two layers (A) and two layers (C) are used.

The first mentioned laminated film ① (denoted hereinafter as the first laminate) is composed of a layer of the thermoplastic polyester resin (A), a layer of the adhesive (B) and a layer of the resin based on cycloolefin (C) laminated in this order.

For the second mentioned laminated film ②, two combinations of the layers, namely, (A)/(B)/(C)/(B)/(A) and (A)/(B)/(A)/(B)/(C) may be considered.

It suffices for the laminated films according to the present invention only that they include a lamination structure of (A)/(B)/(C), while they may include other structures, such as (A)/(B)/(A) etc. Therefore, the above laminated film having the structure of (A)/(B)/(A)/(B)/(C) falls, of course, under the scope of the present invention.

Among the laminated films ②, one in which both the outer-most layers consist of the resin (A) is preferred (hereinafter denoted as the second laminate), namely, the lamiated film composed of a layer of the thermoplastic polyester resin (A), a layer of the adhesive (B), a layer of the resin based on cycloolefin (C), a layer of the adhesive (B) and a layer (A) of the thermoplastic polyester resin (A) laminated in this order.

In consideration of the heat resistance, shock resistance, easy hand-tearability (namely, a property of being torn easily by hand) and moistureproof property, the laminated film according to the present invention may desirably have a total thickness in the range of, in general, 5–250 $\mu$m, preferably 10–100 $\mu$m, more preferably 15–70 $\mu$m and most preferably 15–50 $\mu$m.

The thickness of the layer of thermoplastic polyester resin (A) composing the laminated film may desirably be 0.5–50 $\mu$m, preferably 1–10 $\mu$m, more preferably 2–8 $\mu$m. The thickness of the layer of adhesive (B) may desirably be 0.5–20 $\mu$m, preferably 1–10 $\mu$m, more preferably 1–5 $\mu$m. The thickness of the layer of resin based on cycloolefin (C) may desirably be 5–150 $\mu$m, preferably 5–60 $\mu$m, more preferably 15–50 $\mu$m, most preferably 15–40 $\mu$m. Here, these values for the layer thickness should refer to the sum of each single layer thickness if a plurality of layers are used for each resin.

For example, in the second laminate composed of the combination (A)/(B)/(C)/(B)/(A), the total thickness of the two layers of thermoplastic polyester resin (A) should be in the above-defined range and the total thickness of the two layers of adhesive (B) should be in the above-defined range. In the second laminate, the thickness of each of the two layers of thermoplastic resin (A) and of the two layers of adhesive (B) may either be identical with or different from each other, so long as the total thickness of each two layers is in the defined range.

If the thickness of layer(s) of thermoplastic polyester resin (A) is short of 0.5 $\mu$m, the heat resistance and the shock resistance decrease markedly and, if this exceeds 150 $\mu$m, the easiness in hand tearing decreases considerably.

If the thickness of layer(s) of adhesive (B) is short of 0.5 $\mu$m, the adhesion strength becomes insufficient and, if this exceeds 20 $\mu$m, the easiness in hand tearing decreases considerably.

If the thickness of layer(s) of resin based on cycloolefin (C) is short of 5 $\mu$m, the hand-tearability and the moistureproof property become insufficient and, if this exceeds 150 $\mu$m, the resulting laminated film may loose its adequate flexibility, resulting in an deterioration of practical applicability to, for example, packaging film.

In the laminated film according to the present invention, the layer, or a part or all of the layers, if present, of thermoplastic polyester resin (A) and/or the layer, or a part or all of the layers, if present, of resin based on cycloolefin (C) are constituted of a biaxially stretched film. Here, the extension magnification of such film may desirably be, for both the layers (A) and (C), over 1 time to at most 5 times and preferably 1.3–4 times. The areal magnification in the stretching may desirably be 1.5–20 times, preferably 3–12 times. At such an extension magnification, the laminate having such biaxially stretched film for the layer (A) and/or (C) brings about a marked increase in the easy hand-tearability, shock resistance and heat resistance.

For example, in the second laminate, either one of the layers (A1),(A2) and (C), namely two layers (A1, A2) of the polyester resin (A) and one layer of the cycloolefin resin (C), or preferably voluntary two of these layers, or more preferably all these three layers may be constituted of biaxially stretched film.

For the laminated film according to the present invention, those in which the resilient return angle is at most 80°, preferably at most 60°, most preferably 50° or less are preferred, wherein the return angle is determined by folding a piece of laminated film of 50 mm ×50 mm size on itself at its middle portion, placing thereon a metal plate of 100 g weight and 63 mm×100 mm size and maintaining the film in this state for 1 minute at 23° C. to set a fold, whereupon the angle between the free folded halves of the film at the fold is observed after the metal plate has been removed.

If the resilient return angle of the laminated film is in the above-mentioned range, it can serve favourably for twist packaging of, such as, chocolate or candy, by twisting the wrapped margin, since the twisted state of wrapping is preserved.

The layer of the thermoplastic polyester resin (A) reveals in itself insufficient hand-tearability due to its higher tearing strength. By laminating it with the layer of resin based on cycloolefin (C) and at the same time keeping the thickness of each layer of the laminate in the above-defined range, the laminated film according to the present invention reveals a favourable hand-tearability.

The laminated film according to the present invention is superior in the heat resistance and shock resistance, together with better hand-tearability and excellent moisture-barrier property.

For example, the laminated film according to the present invention can easily be torn by finger both in the longitudinal (processed direction) and lateral directions of the film. The moisture permeability (according to JIS Z 0208) thereof is usually in the range of 0.5–18 $g/m^2$.24 hr, preferably 2–8 $g/m^2$.24 hr.

Thus, the laminated film according to the present invention can favourably be used as multilayer packaging material exhibiting easy hand-tearability for packaging of, for example, food products and drugs, as such or, if necessary, by further laminating on its one side or on both sides with a layer of, for example, PE, PP, aluminum or paper.

<<Production of the Laminated Film>>

The laminated film according to the present invention can be produced either by film forming by co-extrusion or by film lamination. More concretely, as the film forming technique by co-extrusion, there are a technique with co-extrusion T-die, a technique of co-extrusion inflation molding and a technique of co-extrusion lamination. For the film lamination method, concretely, dry lamination may be employed.

Among these forming techniques, the film forming by co-extrusion is preferable. The co-extrusion forming is more favourable and more superior in the productivity as compared with the film lamination method, since it does not require any drying process for removing the solvent in the adhesive used during the processing (such as the organic solvent in the adhesive for dry lamination) as in the film lamination method.

In processing by dry lamination, the adhesive (B) is applied onto the inside surface of either one of the sheets for the layers (A) and (C), preferably onto the inside surface of the sheet for the thermoplastic polyester resin (A) and the sheets are then laminated in a lamination sequence of, for example, (A)/(B)/(C) or (A)/(B)/(C)/(B)/(A), whereupon the resulting laminated film is heated in a hot blast furnace at a temperature of, for example, 80–120° C. to dry off the solvent in the layer of adhesive (B) and is then, after pressing on a hot roller at a temperature of 60–80° C. (under a pressure of, for example, $9.8 \times 10^4$–$9.8 \times 10^5$ Pa, i.e. 1–10 kgf/cm$^2$), wound up on a roll. The so-wound laminated film is then preferably maintained at a temperature of 35–45° C. for a duration over 24 hours to subject it to an aging, in order to facilitate hardening of the adhesive (B).

According to the present invention, the sheets for producing the laminated film can be subjected to a biaxial stretching during the film production process.

For biaxial stretching of the sheet, a tenter successive biaxial stretching or tenter simultaneous biaxial stretching by co-extrusion T-die or a tubular biaxial stretching by co-extrusion inflation molding may be employed. Among them, the tenter successive biaxial stretching by co-extrusion T-die is more preferable in view of the productivity. It is preferable to perform the stretching on a in-line processing system in which all the processes from the extrusion of the sheet to the stretching are effected successively.

The biaxial stretching by co-extrusion T-die may preferably be performed in the following manner. Thus, the resins for the respective layers are extruded from the T-die of an extruder in a form of molten laminate into a sheet. This sheet is first stretched in the longitudinal direction on a hot roller heated at 80–120° C. and is then subjected to a stretching in the lateral direction in a heating furnace at 100–140° C. by fastening the side edges of the sheet by clipping means called "tenter" and spreading this tenter to extend the sheet laterally, whereupon the so stretched sheet is subjected to a heat setting at a temperature of some 140–200° C. to cause the sheet to stabilize thermally. Here, the extension magnification and the areal magnification on the stretching should be chosen in the range defined previously.

In case the laminated film according to the present invention is composed of three layers of (A)/(B)/(C) and the layers (A) and (C) are each composed of a biaxially streched sheet, it is particularly preferable to effect the production thereof by a triple layer co-extrusion biaxial stretching or a triple layer co-extrusion tubular biaxial stretching. When the laminated film is produced by such a production process, occurence of whitening of the layer of resin based on cycloolefin (C) can be suppressed and a laminate of superior transparency is obtained. Other production processes may also be employed favourably, for example, a triple layer co-extrusion casting, a triple layer co-extrusion inflation molding, a co-extrusion lamination of the adhesive (B) and the resin based on cycloolefin (C) onto a sheet of the thermoplastic polyester resin (A) and a dry laminatin of a biaxially stretched sheet of the thermoplastic polyester resin (A) with a sheet of the resin based on cycloolefin (C) under interposition of a layer of the adhesive (B). In these production processes, it is either possible to laminate the sheets and to subject the resulting laminate to a biaxial stretching or to laminate preliminarily biaxially stretched sheets.

If the laminated film according to the present invention is composed of five layers of (A)/(B)/(C)/ (B)/(A) and is subjected to a biaxial stretching, it is particularly favourable to produce the film by a pentalayer co-extrusion tenter biaxial stretching or a pentalayer co-extrusion tubular biaxial stretching. When the film is produced in such a production process, occurence of whitening of the layer of resin based on cycloolefin (C) can be suppressed and a laminate of superior transparency is obtained. Other production processes may also be employed favourably, for example, a pentalayer co-extrusion T-die, a pentalayer co-extrusion inflation molding and a co-extrusion lamination of adhesive (B)/resin based on cycloolefin (C)/adhesive (B) onto a sheet of the thermoplastic polyester resin (A). In these production processes, it is either possible to laminate the sheets and to subject the resulting laminate to a biaxial stretching or to laminate preliminarily biaxially stretched sheets.

The thickness of each layer of the laminated film produced as above should be in the previously defined range.

It is possible that the laminated film according to the present invention is further provided, on either one surface or on both surfaces, with a layer or, if necessary, with a combination of a plurality of adequately chosen layers of paper, aluminum foil, PE (especially high density polyethylene HDPE, linear low density polyethylene LLDPE) or PP.

For producing the laminated film having foreign layer(s), it is possible, for example, to laminate such foreign layer(s) during the lamination of the layers of (A), (B) and (C) together therewith simultaneously or to laminate a plurality of foreign layers with the already formed laminate of the layers (A), (B) and (C) successively one by one. There is no limitation for the lamination of foreign layer. A layer of PE or PP can serve favourably as a heat sealing layer for producing a package bag.

While it is preferable for applying foreign layer(s) onto the laminated film, that the laminated film is a pentalayer laminate composed of a layer of the thermoplastic polyester resin (A)/a layer of the adhesive (B)/a layer of the resin based on cycloolefin (C)/a layer of the adhesive (B)/a layer of the thermoplastic polyester resin (A), it is also possible that the laminated film is a triple layer laminate composed of a layer of the thermoplastic polyester resin (A)/a layer of the adhesive (B)/a layer of the resin based on cyloolefin (C).

Concrete examples of laminated film having foreign layer (s) are given below:

(a) A laminate of the above 3- or 5-layers/a PE layer
(b) A laminate of the above 3- or 5-layers/a PP layer
(C) A laminate of the above 3- or 5-layers/an aluminum foil/a layer of PP
(d) Paper/a layer of PE/a laminate of the above 3- or 5-layers/an aluminum foil/a layer of PE
(e) A laminate of the above 3- or 5-layers/a layer of PE/paper/a layer of PE The laminated films of above (a) to (e) exhibit superior heat resistance and shock resistance required for a packaging film together with a better hand-tearability and a high moistureproof property, so that they can be employed especially favorably for packaging films for food products and drugs.

The packaging material according to the present inevntion is composed of the laminated film described above.

Concrete examples of applications of the laminated film or the packaging matrial are given below:

(f) Above 3- or 5-layered laminated film; Twist wrapping sheet for candy and chocolate
(g) Above 3- or 5-layered laminated film/PE film: Packagings of snack cracker, pickles, kneaded marine products and other vacuum packaged products
(h) Dressing paper/above 3- or 5-layered laminated film/PE film: Packagings of rice cracker etc.
(i) Above 3- or 5-layered laminated film/paper/aluminum foil/PE film: Packagings of powdered soup etc.
(j) Above 3- or 5-layered laminated film/PP film: Packagings of green tee etc.
(k) Above 3- or 5-layered laminated film/aluminum foil/ PE, PP: Packagings of flavour-preserving food products etc.

For all the applications, the laminated film according to the present invention provides the packaging material with easy hand-tearability and high moistureproof property, so that the packaging material exhibits a high practicability.

For applications where an effect of shielding the article to be packaged is required, a basal sheet exhibiting a shielding ability, such as a synthetic paper manufactured by an internally paper-structuring technique or aluminum foil, can be used, on which the laminated film according to the presetnt invention is laminated.

The laminated film according to the present invention exhibits a remarkably excellent easy hand-tearability and moisture-barrier property while preserving the resistances to heat and to shock requisite for a packaging film especially for food products and drugs. By applying the laminated film according to the present invention onto a conventional packaging film, a packaging sheet, especially for an easily hand-breakable packaging, having an excellent easy hand-tearability and a moisture-barriering property which have not been attained by the prior art can be brought about. Therefore, the laminated film according to the present invention can favourably be used as a packaging film for food products and drugs. The laminated film according to the present invention is made of chlorine-free materials and, in addition, can be manufactured in a simple manner and economically.

The packaging material according to the present invention is superior in the resistances to heat and to shock together with high moisture-barrier property and excellent hand-tearability, since it includes a layer of the above-described laminated film. The articles packaged by this packaging material can be transported and preserved reliably and yet, can be taken out of the package quite easily.

THE BEST MODE FOR EMBODYING THE INVENTION

Below, the present invention will be described in detail by way of Examples, wherein it should be recognized that the invention is not restricted in any respect by these Examples.

The practical method of determination of the material properties of the films and the criterion for the assessments thereof are as follows:

(1) Easy Hand-Tearability:

Evaluation was made for whether the laminated film can be torn directly by hand in the longitudinal and lateral directions of the film. The criterion of the evaluation is as follows:

○: the film can be torn easily without resistance.
Δ: the film can be torn with slight resistance.
x: the film cannot be torn.

(2) Moistureproof Property:

Moisture permeability ($g/m^2$.24 hr) of the film was determined according to JIS Z 0208.

(3) Heat Resistance:

On a strip of the film of 15 mm width, a straight line mark of 10 cm length was drawn and the strip was then held in a heating oven heated at a settled temperature (100° C. or 120° C.) for 5 minutes, whereupon the length L (cm) of the straight line mark was measured. The heat shrinkage [(10-L)/10]×100 (%) was used as the measure of the heat resistance.

(4) Shock Resistance:

Using a film impact tester (with terminal end sphere of ½ inch radius; Toyo Seiki Seisaku-Sho, Ltd.), the smash-through strength of the film was determined, which was used as the measure of the shock resistance.

(5) Resilient Return Angle:

A test sheet of 50 mm×50 mm size was cut from the laminated film produced in the Example. This sheet was folded on itself at its middle portion, then, a matal plate of 63 mm×100 mm size of a 100 g weight was placed on the folded sheet and the sheet was maintained in this state for 1 minute at 23° C. to set a fold. The metal plate was then taken off and the angle between the freely spread folded halves of the sheet at the fold was observed.

(6) Determination of the Thickness of each Layer:

The cut section of the laminated film was photographed under an optical microscope, wherefrom the thickness of each layer was determined.

Example 1

Using an extruder of a 3-feedblock 5-layer type (with screw diameters of 90 mm, 65 mm and 65 mm), each resin was extruded under melt lamination from a T-die (with a die opening width of 460 mm and a die slit width of 1.5 mm) of a shape of coat hanger at a temperature in the T-die of 280° C. The thereby obtained 3-resin 5-layer laminated sheet with a lamination sequence as given below of a 220 μm thickness was drawn up while winding around a cooling roller to cool and solidify it. Then, the sheet was directly guided to a successive biaxial stretching apparatus to effect a biaxial stretching. The biaxial stretching was carried out in a conventional manner, wherein a longitudinal roller stretching was effected first followed succeedingly by a lateral tenter stretching. The material properties of the so-stretched laminated film were evaluated. The results are shown in Table 1.

The kinds of the resins used and the conditions of the stretching were as follows:

(1) Extruded resins:
   ○ Thermoplastic polyester resin (A):
   Trade article No. FX001 (a polyethylene terephthalate with an intrinsic viscosity [η] of 0.67 dl/g, a density of 1.40 g/cm³, a melting point of 256° C., a terephthalic acid content in the carboxylic acid component of 100 mole % and an ethylene glycol content in the dihydroxy compound component of 100 mole %: a product of Mitsubishi Rayon Co., Ltd.), which is referred to hereinafter as PET-1.
   ○ Adhesive (B):
   Trade article No. SF730 [Adomer (trademark) of Mitsui Petrochemical Ind., Ltd.; with an MFR value (at 230° C., 2.16 kg load) of 2.7 g/10 min. and a density of 0.88 g/cm³]
   ○ Resin based on cycloolefin (C):
   Ethylene/norbornene random copolymer with an ethylene content of 69 mole %, a norbornene content of 31 mole %, an MFR value (at 260° C., 2.16 kg load) of 25 g/10 min., a glass transition temperature of 80° C., a softening temperature of 90° C., a degree of crystallinity of 0% and an intrinsic viscosity [η] of 0.78 dl/g, which is denoted hereinafter as COC-1.

(2) Extruded sheet:
   ○ Construction:
   A pentalayer laminate with a lamination sequence of (A)/(B)/(C)/(B)/(A), in which the first layer of the thermoplastic polyester resin (A) consists of PET-1 with a thickness of 20 μm, the second layer of the adhesive (B) consists of "SF730" with a thickness of 15 μm, the third layer of the resin based on cycloolefin (C) consists of COC-1 with a thickness of 130 μm, the fourth layer of the adhesive (B) consists of "SF730" with a thickness of 15 μm and the fifth layer of the thermoplastic polyester resin (A) consists of PET-1 with a thickness of 20 μm. The total thickness of (A)+(B)+(C)+(B)+(A) is 200 μm.
   ○ Draw-up rate: 6 m/minute.
   ○ Biaxial Stretching:
Extension magnification: longitudinal=3.2 times, lateral=3.2 times,
Stretching temperature: 87° C. at the longitudinal stretching roller and 100° C. at the lateral tenter, with a heat setting temperature of 200° C.
Total thickness of the stretched laminate=20 μm:
   Total thickness of the layers (A)=4 μm
   Total thickness of the layers (B)=3 μm
   Thickness of the layer (C)=13 μm

Example 2

The procedures of Example 1 were followed except that the construction of the extruded laminate was changed to PET-1 (30 μm)/SF730 (15 μm)/COC-1 (130 μm)/SF730 (15 μm)/PET-1 (30 μm). The total thickness of the extruded laminate was 22 μm, wherein the total thickness of the layers (A) was 6 μm, the total thickness of the layers (B) was 3 μm and the thickness of the layer (C) was 13 μm. The results are given in Table 1.

Example 3

The procedures of Example 1 were followed except that the construction of the extruded laminate was changed to PET-1 (10 μm)/SF730 (15 μm)/COC-1 (130 μm)/SF730 (15 μm)/PET-1 (10 μm). The total thickness of the extruded laminate was 18 μm, wherein the total thickness of the layers (A) was 2 μm, the total thickness of the layers (B) was 3 μm and the thickness of the layer (C) was 13 μm. The results are given in Table 1.

Example 4

The procedures of Example 1 were followed. However, the resins employed were changed to:
   ○ the thermoplastic polyester resin (A): a polyethylene terephthalate with an intrinsic viscosity [η] of 0.85 dl/g, a density of 1.04 g/cm³, a melting point of 260° C., a terephthalic acid content in the dicarboxylic acid component of 100 mole % and an ethylene glycol content in the dihydroxy compound component of 100 mole %, which is referred to hereinafter as PET-2.
   ○ the resin based on cycloolefin (C): an ethylene/tetracyclododecene copolymer with an ethylene content of 68 mole %, a tetracyclododecene content of 32 mole %, an MFR at 260° C., 2.16 kg load of 25 g/10 min., a glass transition temperature of 105° C., a softening temperature of 115° C., a degree of crystallinity of 0% and an intrinsic viscosity [η] of 0.60 dl/g, which is denoted hereinafter as COC-2.
The composition of the extruded laminate was changed to PET-2 (20 μm)/SF730 (10 μm)/COC-2 (160 μm)/SF730 (10 μm)/PET-2 (20 μm). Further, the extrusion conditions were changed to:
   Extension magnification: lingitudinal=2 times, lateral=3 times,
   Stretching temperature: 95° C. at the longitudinal stretching roller and 115° C. at the lateral tenter, with a heat setting temperature of 140° C.
   Total thickness of the stretched laminate=36 μm:
      Total thickness of the layers (A)=7 μm
      Total thickness of the layers (B)=3 μm
      Thickness of the layer (C)=26 μm
The results are given in Table 1.

TABLE 1

| | Example 1 | Example 2 | Example 3 | Example 4 |
|---|---|---|---|---|
| Hand-tearability | | | | |
| longitudinal | ○ | ○ | ○ | ○ |
| lateral | ○ | Δ | ○ | ○ |
| Moist. permeability (g/m² · 24 hr) | 5 | 5 | 5 | 3 |

TABLE 1-continued

|  | Example 1 | Example 2 | Example 3 | Example 4 |
|---|---|---|---|---|
| Heat resistance (heat shrinkage %) | | | | |
| 100° C., longitudinal/lateral | 0/0 | 0/0 | 0/0 | 0/0 |
| 120° C., longitudinal/lateral | 0.5/1.4 | 0.5/1.8 | 0.6/0.8 | 0/2.0 |
| Shock resistance (kJ/m) | 15 | 32 | 6 | 16 |
| Return angle of laminate | 38° | 40° | 35° | 40° |
| Thickness of PET after stretching (μm) | 4 | 6 | 2 | 7 |

Comparative Example 1

The procedures of Example 1 were followed, except that the thermoplastic polyester resin (A) was changed to a PP resin (a PP resin of trade article No. F308 of Mitsui Petrochemical Ind., Ltd. with an MFR at 230° C. of 1.9 g/10 min. and a melting point of 159° C., which is referred to in the following as PP-1), the adhesive (B) was changed to QF551 (Trade article No. 551) (Adomer (trademark) of Mitsui Petrochemical Ind., Ltd. with an MFR at 190° C. of 5.7 g/10 min., the construction of the extruded laminate was changed to PP-1 (120 μm)/QF551 (60 μm)/COC-2 (420 μm)/QF551 (60 μm)/PP-1 (120 μm), the extension magnification was changed to 3 times (longitudinal)×10 times (lateral) and the total thickness of the extruded laminate was changed to 26 μm, wherein the total thickness of the layers (A) was 8 μm, the total thickness of the layers (B) was 4 μm, and the thickness of the layer (C) was 14 μm.

The resulting laminated film was examined for its materials porperties as in Example 1. The results are recited in Table 2.

Comparative Example 2

A commercial moistureproof cellophane "MST#300" (treated on both surfaces with vinylidene chloride, a product of Tohcello Co., ltd. with a thickness of 21 μm) was examined for its material properties in the same manner as in Example 1. The results are recited in Table 2.

Comparative Example 3

A commercial biaxially stretched thermoplastic polyester resin film "Empressed PET #12" (a product of Unichika, ltd. with a film thickness of 12 μm) was examined for its material properties in the same manner as in Example 1. The results are recited in Table 2.

Comparative Example 4

Using the thermoplastic polyester resin (A), the adhesive (B) and the resin based on cycloolefin (C) used each in Example 4, a pentalayer laminate of lamination sequence of (A)/(B)/(C)/(B)/(A) of layer thicknesses of 5/2/30/2/5 μm, was produced on a multilayer T-die extruder. This laminate was not subjected to film stretching. The material properties of this unstretched laminate were examined as in Example 1. The results are recited in Table 2.

TABLE 2

|  | Comp. Ex. 1 | Comp. Ex. 2 | Comp. Ex. 3 | Comp. Ex. 4 |
|---|---|---|---|---|
| Hand-tearability | | | | |
| longitudinal | ◯ | ◯ | x | Δ |
| lateral | Δ | ◯ | x | Δ |
| Moist. permeability (g/m² · 24 hr) | 4 | 40 | 55 | 5 |
| Heat resistance (heat shrinkage %) | | | | |
| 100° C., longitudinal/lateral | 0/3 | 0/0 | 0/0 | 8/2 |
| 120° C., longitudinal/lateral | 7/14 | 0/0 | 0/0 | 13/2 |
| Shock resistance (kJ/m) | 36 | 11 | 41 | 1 |
| Return angle of laminate | 90° | 25° | 90° | 90° |
| Thickness of PET (μm) | — | — | 12 | 10 |

We claim:

1. A laminated film having resistance to heat and to shock, moisture-barrier property and hand-tearability, which comprises one or more layers of a thermoplastic polyester resin (A), one or more layers of a resin based on cycloolefin (C) and one or more interposed layers of an adhesive (B) between layer (A) and layer (C), wherein the layer(s) of the thermoplastic polyester resin (A) and optionally the layer(s) of the resin based on cycloolefin (C) have been biaxially stretched and wherein the total thickness of the layer(s) of the thermoplastic polyester resin (A), the total thickness of the layer(s) of the adhesive (B) and the total thickness of the layer(s) based on cycloolefin (C) are 0.5–50 μm, 0.5–20 μm and 5–150 μm, respectively.

2. A laminated film as claimed in claim 1, wherein the the stretching of the layer(s) is, both in longitudinal and lateral directions, from over 1 time to at most 5 times and the area increase thereof amounts to 1.5–20 times.

3. A laminated film as claimed in claim 1, wherein the film comprises one single layer of the thermoplastic polyester resin (A) and one single layer based on the cycloolefin resin (C).

4. A laminated film as claimed in claim 1, wherein the film comprises two layers of the thermoplastic polyester resin (A) and one single layer based on the cycloolefin resin layer (C) wherein both the outermost layers are that of the thermoplastic polyester resin (A).

5. A laminated film as claimed in claim 1, wherein the thermoplastic polyester resin (A) comprises structural unit of terephthalic acid in a proportion of at least 80 mole % of the total structural units of dicarboxylic acid component as well as structural unit of ethylene glycol in a proportion of at least 80 mole % of the total structural units of dihydroxy compound component and has an intrinsic viscosity (η) of 0.5–1.4 dl/g.

6. A laminated film as claimed in claim 1, wherein the adhesive (B) comprises a graft-modified random copolymer of ethylene and α-olefin, which is graft-modified with an unsaturated carboxylic acid or with a derivative thereof.

7. A laminated film as claimed in claim 1, wherein the resin based on cycloolefin (C) consists of either one or two or more of (C-1), (C-2), (C-3) and (C-4) given below, (C-1): an ethylene/cycloolefin random copolymer obtained from copolymerization of a cycloolefin represented by the following general formula (1) or (2) with ethylene:

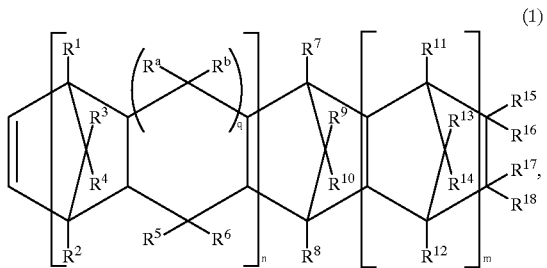

(1)

in which n is 0 or 1, m is 0 or a positive integer, q is 0 or 1, $R^1$ to $R^{18}$ and $R^a$ and $R^b$ denote each, independently of each other, hydrogen atom, a halogen atom or a hydrocarbon group which may be substituted by halogen, wherein $R^{15}$ to $R^{18}$ may combine together to form a mono- or polycyclic ring which may have double bond(s) and wherein the pair of $R^{15}$ and $R^{16}$ or of $R^{17}$ and $R^{18}$ may form an alkylidene group,

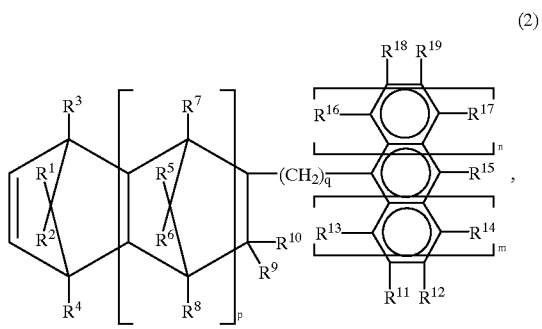

(2)

in which p and q denote each 0 or a positive integer, m and n represent each 0, 1 or 2, $R^1$ to $R^{19}$ denote each, independently of each other, hydrogen atom, a halogen atom or a hydrocarbon or alkoxy group which may be substituted by halogen, wherein the carbon atom bound to $R^9$ and $R^{10}$ and the carbon atom bound to $R^{13}$ or the carbon atom bound to $R^{11}$ may be coupled with each other either directly or through an alkylene group of 1–3 carbon atoms and, in the case of n=m=0, the pair of $R^{15}$ and $R^{12}$ or of $R^{15}$ and $R^{19}$ may combine together to form a mono- or polycyclic aromatic ring;

(C-2): a product of ring opening-polymerization or copolymerization of the cycloolefin(s) represented by the formula (1) and/or (2);

(C-3) a hydrogenated product of said polymerization or copolymerization product of (C-2); and (C-4) a graft-modified product of the above product (C-1), (C-2) or (C-3).

8. A laminated film as claimed in claim 7, wherein the glass transition temperature of the layer of the resin based on ethylene/cycloolefin is 60–120° C.

9. A laminated film as claimed in claim 7, wherein the resilient return angle is at most 80°, wherein the return angle is determined by folding a piece of laminated film of 50 mm×50 mm size on itself at its middle portion, placing thereon μmetal plate of 100 g weight and 63 mm×100 mm size and maintaining the film in this state at 23° C. for 1 minute to set a fold, whereupon the angle between the free folded halves of the film at the fold after removing the metal plate is observed.

10. A packaging material, comprising one or more layers composed of a laminated film as defined in either one of claims 5 or 7.

11. A laminated film as claimed in claim 1, having resistances to heat and to shock, moisture-barrier property and hand-tearability, which comprises one or more layers of a thermoplastic polyethylene terephthalate polyester resin (A), one or more layers of a resin based on ethylene/cycloolefin (C) and one or more interposed layers of an adhesive (B) between layer (A) and layer (C), wherein the layer(s) of the thermoplastic polyethylene terephthalate polyester resin (A), has been biaxially stretched and wherein the total thickness of the layer(s) of the thermoplastic polyethylene terephthalate polyester resin (A), the total thickness of the layer(s) of the adhesive (B) and the total thickness of the layer(s) based on ethylene/cycloolefin (C) are 0.5–50 μm, 0.5–20 μm and 5–150 μm, respectively.

12. A laminated film as claimed in claim 1, having resistances to heat and to shock, moisture-barrier property and hand-tearability, which comprises one or more layers of a thermoplastic polyethylene terephthalate polyester resin (A), one or more layers of a resin based on ethylene/cycloolefin (C) and one or more interposed layers of an adhesive (B) between layer (A) and layer (C), wherein the layer(s) of the thermoplastic polyethylene terephthalate polyester resin (A) and the layers(s) of the resin based on ethylene/cycloolefin (C) have been biaxially stretched and wherein the total thickness of the layer(s) of the thermoplastic polyethylene terephthalate polyester resin (A), the total thickness of the layer(s) of the adhesive (B) and the total thickness of the layer(s) based on ethylene/cycloolefin (C) are 0.5–50 μm, 0.5–20 μm and 5–150 μm, respectively.

13. A laminated film having resistance to heat and to shock, moisture-barrier property and hand-tearability, which comprises one or more layers of a thermoplastic polyethylene terephthalate polyester resin (A), one or more layers of a resin based on ethylene/cycloolefin (C) and one or more interposed layers of an adhesive (B) between layer (A) and layer (C), wherein the layer(s) of the thermoplastic polyester resin (A), and optionally the layer(s) of the resin based on ethylene/cycloolefin (C) have been biaxially stretched and wherein the total thickness of the layer(s) of the thermoplastic polyethylene terephthalate polyester resin (A), the total thickness of the layer(s) of the adhesive (B) and the total thickness of the layer(s) based on ethylene/cycloolefin (C) are 0.5–50 μm, 0.5–20 μm and 5–150 μm, respectively, wherein the thermoplastic polyethylene terephthalate polyester resin (A) comprises structural unit of terephthalic acid in a proportion of at least 80 mole % of the total structural units of dicarboxylic acid component as well as structural unit of ethylene glycol in a proportion of at least 80 mole % of the total structural units of dihydroxy compound component and has an intrinsic viscosity (η) of 0.5–1.4 dl/g, and wherein the resin based on ethylene/cycloolefin (C) consists of either one or two or more of (C-1), (C-2), (C-3) and (C-4) given below, (C-1): an ethylene/cycloolefin random copolymer obtained from copolymerization of a cycloolefin represented by the following general formula (1) or (2) with ethylene:

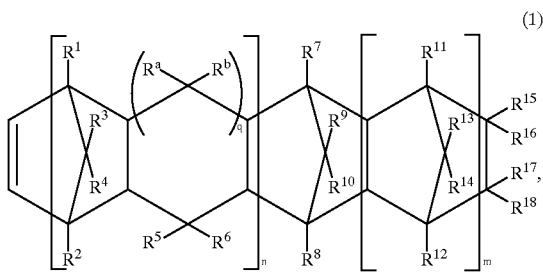

in which n is 0 or 1, m is 0 or a positive integer, q is 0 or 1, $R^1$ to $R^{18}$ and $R^a$ and $R^b$ denote each, independently of each other, hydrogen atom, a halogen atom or a hydrocarbon group which may be substituted by halogen, wherein $R^{15}$ to $R^{18}$ may combine together to form a mono- or polycyclic ring which may have double bond(s) and wherein the pair of $R^{15}$ and $R^{16}$ or of $R^{17}$ and $R^{18}$ may form an alkylidene group,

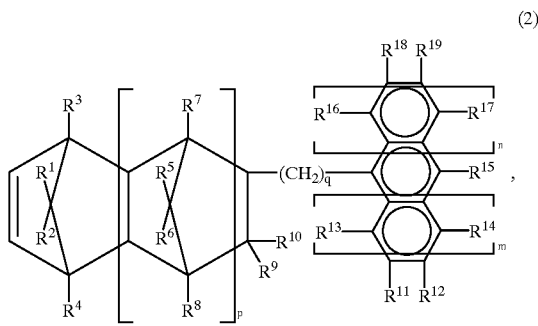

in which p and q denote each 0 or a positive integer, m and n represent each 0, 1 or 2, $R^1$ to $R^{19}$ denote each, independently of each other, hydrogen atom, a halogen atom or a hydrocarbon or alkoxy group which may be substituted by halogen, wherein the carbon atom bound to $R^9$ and $R^{10}$ and the carbon atom bound to $R^{13}$ or the carbon atom bound to $R^{11}$ may be coupled with each other either directly or through an alkylene group of 1–3 carbon atoms and, in the case of n=m=0, the pair of $R^{15}$ and $R^{12}$ or of $R^{15}$ and $R^{19}$ may combine together to form a mono- or polycyclic aromatic ring;

(C-2): a product of ring opening-polymerization or copolymerization of the cycloolefin(s) represented by the formula (1) and/or (2);

(C-3) a hydrogenated product of said polymerization or copolymerization product of (C-2); and (C-4) a graft-modified product of the above product (C-1), (C-2) or (C-3).

14. A laminated film as claimed in claim 13, wherein the stretching of the layer(s) is, both in longitudinal and lateral directions, from over 1 time to at most 5 times and the area increase thereof amounts to 1.5–20 times.

15. A laminated film as claimed in claim 13, wherein the film comprises one single layer of the thermoplastic polyester resin (A) and one single layer based on the cycloolefin resin (C).

16. A laminated film as claimed in claim 13, wherein the film comprises two layers of the thermoplastic polyester resin (A) and one single layer based on the cycloolefin resin layer (C) wherein both the outermost layers are that of the thermoplastic polyester resin (A).

17. A laminated film as claimed in claim 13, wherein the adhesive (B) comprises a graft-modified random copolymer of ethylene and α-olefin, which is graft-modified with an unsaturated carboxylic acid or with a derivative thereof.

18. A laminated film as claimed in claim 13, wherein the glass transition temperature of the layer of the resin based on ethylene/cycloolefin is 60–120° C.

19. A laminated film as claimed in claim 13, wherein the resilient return angle is at most 80°, wherein the return angle is determined by folding a piece of laminated film of 50 mm×50 mm size on itself at its middle portion, placing thereon a metal plate of 100 g weight and 63 mm×100 mm size and maintaining the film in this state at 23° C. for 1 minute to set a fold, whereupon the angle between the free folded halves of the film at the fold after removing the metal plate is observed.

20. A laminated film packaging material having resistance to heat and to shock, moisture-barrier property and hand-tearability, which comprises one or more layers of a thermoplastic polyethylene terephthalate polyester resin (A), one or more layers of a resin based on ethylene/cycloolefin (C) and one or more interposed layers of an adhesive (B) between layer (A) and layer (C), wherein the layer(s) of the thermoplastic polyester resin (A) and optionally the layer(s) of the resin based on cycloolefin (C) have been biaxially stretched and wherein the total thickness of the layer(s) of the thermoplastic polyethylene terephthalate polyester resin (A), the total thickness of the layer(s) of the adhesive (B) and the total thickness of the layer(s) based on ethylene/cycloolefin (C) are 1–10 μm, 1–10 μm and 5–60 μm, respectively, wherein the thermoplastic polyethylene terephthalate polyester resin (A) comprises structural unit of terephthalic acid in a proportion of at least 80 mole % of the total structural units of dicarboxylic acid component as well as structural unit of ethylene glycol in a proportion of at least 80 mole % of the total structural units of dihydroxy compound component and has an intrinsic viscosity (η) of 0.6–1.1 dl/g, wherein the adhesive (B) comprises a graft-modified random copolymer of ethylene and α-olefin, which is graft-modified with an unsaturated carboxylic acid or with a derivative thereof, and wherein the resin based on ethylene/cycloolefin (C) comprises an ethylene/cycloolefin random copolymer having a glass transition temperature of 60° to 120° C. obtained from copolymerization of a cycloolefin represented by the following general formula (1) with ethylene:

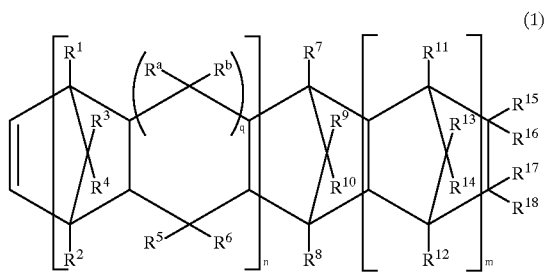

in which n is 0 or 1, m is 0 or a positive integer, q is 0 or 1, $R^1$ to $R^{18}$ and $R^a$ and $R^b$ denote each, independently of each other, hydrogen atom, a halogen atom or a hydrocarbon group which may be substituted by halogen, wherein $R^{15}$ to $R^{18}$ may combine together to form a mono- or polycyclic ring which may have double bond(s) and wherein the pair of $R^{15}$ and $R^{16}$ or of $R^{17}$ and $R^{18}$ may form an alkylidene group.

21. A laminated film as claimed in claim 20, wherein the stretching of the layer(s) is, both in longitudinal and lateral directions, from over 1 time to at most 5 times and the area increase thereof amounts to 1.5–20 times.

22. A laminated film as claimed in claim 21, wherein the film comprises one single layer of the thermoplastic polyester resin (A) and one single layer based on the cycloolefin resin (C).

23. A laminated film as claimed in claim 21, wherein the film comprises two layers of the thermoplastic polyester resin (A) and one single layer based on the cycloolefin resin layer (C) wherein both the outermost layers are that of the thermoplastic polyester resin (A).

24. A laminated film as claimed in claim 1, 13 or 20, wherein the layer(s) of the thermoplastic polyester resin (A) and the layer(s) of the resin based on the cycloolefin (C) have been biaxially stretched.

* * * * *